US009086766B2

(12) United States Patent
Hsieh

(10) Patent No.: US 9,086,766 B2
(45) Date of Patent: Jul. 21, 2015

(54) TOUCH PANEL AND TOUCH DISPLAY PANEL

(75) Inventor: Ming-Lun Hsieh, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 325 days.

(21) Appl. No.: 13/155,410

(22) Filed: Jun. 8, 2011

(65) Prior Publication Data

US 2012/0169626 A1 Jul. 5, 2012

(30) Foreign Application Priority Data

Dec. 31, 2010 (TW) ................................ 99147244 A

(51) Int. Cl.
*G06F 3/044* (2006.01)

(52) U.S. Cl.
CPC ..................................... *G06F 3/044* (2013.01)

(58) Field of Classification Search
CPC .......... G06F 3/044; G06F 2203/04111; G06F 2203/04112
USPC ................. 345/173, 174; 178/18.06
See application file for complete search history.

(56) References Cited

U.S. PATENT DOCUMENTS

| 7,864,503 | B2 |   | 1/2011 | Chang |   |
|---|---|---|---|---|---|
| 7,868,874 | B2 | * | 1/2011 | Reynolds | 345/173 |
| 8,144,129 | B2 | * | 3/2012 | Hotelling et al. | 345/174 |
| 2006/0097991 | A1 | * | 5/2006 | Hotelling et al. | 345/173 |
| 2008/0143683 | A1 |   | 6/2008 | Hotelling |   |
| 2008/0277259 | A1 |   | 11/2008 | Chang |   |
| 2008/0309633 | A1 |   | 12/2008 | Hotelling et al. |   |
| 2009/0002337 | A1 | * | 1/2009 | Chang | 345/174 |
| 2009/0194344 | A1 |   | 8/2009 | Harley et al. |   |
| 2010/0194707 | A1 | * | 8/2010 | Hotelling et al. | 345/173 |

FOREIGN PATENT DOCUMENTS

| CN | 101833404 | 9/2010 |
| TW | 200844827 | 11/2008 |
| TW | 200901014 | 1/2009 |

OTHER PUBLICATIONS

"Office Action of Taiwan counterpart application" issued on Apr. 25, 2013, p. 1-p. 8.

* cited by examiner

*Primary Examiner* — Lun-Yi Lao
*Assistant Examiner* — Ibrahim Khan
(74) *Attorney, Agent, or Firm* — Jianq Chyun IP Office

(57) ABSTRACT

A touch panel including a substrate, a plurality of driving electrode series and a plurality of sensing electrode series is provided. The plurality of driving electrode series extending along a first direction is disposed on the substrate. The plurality of sensing electrode series extending along a second direction different from the first direction is disposed on the substrate. The plurality of driving electrode series and the plurality of sensing electrode series are intersected to constitute a plurality of sensing units, in which each sensing unit has a center region and a surrounding region. A first electrode spacing is formed between the driving electrode series and the sensing electrode series disposed in the center region, and a second electrode spacing is formed between the driving electrode series and the sensing electrode series disposed in the surrounding region. The second electrode spacing is smaller than the first electrode spacing.

18 Claims, 8 Drawing Sheets

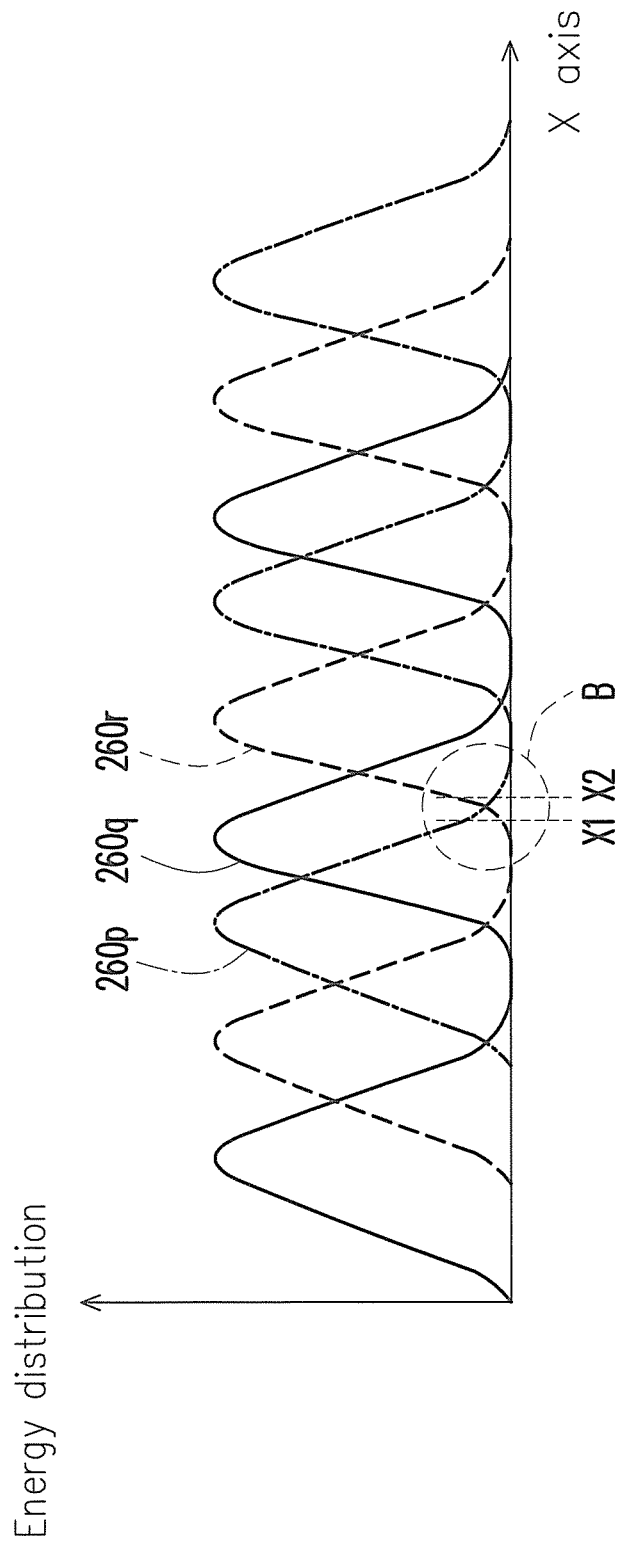

TOUCH PANEL AND TOUCH DISPLAY PANEL

CROSS-REFERENCE TO RELATED APPLICATION

This application claims the priority benefit of Taiwan application serial no. 99147244, filed Dec. 31, 2010. The entirety of the above-mentioned patent application is hereby incorporated by reference herein and made a part of this specification.

BACKGROUND OF THE INVENTION

1. Field of the Invention

The present invention relates to a touch panel and a touch display panel, in particular, to a capacitive touch display panel.

2. Description of Related Art

In recent years, with the rapid development of, for example, information technology, wireless and mobile communication, and information appliances, for the purpose of more convenience, lighter weight and more humanization, a touch panel has gradually replaced a keyboard and a mouse, and becomes a main input device of many information products. Generally, the touch panel is essentially divided into, for example, a resistive touch panel, a capacitive touch panel, an optical touch panel, an acoustic touch panel and an electromagnetic touch panel. For example, the capacitive touch panel may be divided into a self capacitive touch panel and a mutual capacitive touch panel according to a driving and a sensing manner thereof The conventional mutual capacitive touch panel includes a plurality of first electrode series extending along an X-axis direction, and a plurality of second electrode series extending along a Y-axis direction, in which the X-axis direction is different from the Y-axis direction. When a user touches the touch panel through a finger, the capacitance between the first electrode series and the second electrode series may be varied, and such a variation signal is transmitted to a controller, and then a coordinate of the touched position is calculated. When the mutual capacitive touch panel is combined with a display panel to constitute a mutual capacitive touch display panel, displayed images on the display panel may be changed according to the touched position selected by the user.

Generally, in order to improve the sensing sensitivity of the touch panel, a spacing between the first electrode series and the second electrode series needs to be increased, such that the capacitance variation between the first electrode series and the second electrode series is increased, so as to strengthen the sensed signal of the capacitance variation. However, although increasing the spacing between the first electrode series and the second electrode series may strengthen the sensed signal of a touched point of a user, when the spacing between the first electrode series and the second electrode series is too large, the touched point cannot be correctly calculated by using an overlapped proportion of the adjacent sensed signals in combination with interpolation, since an overlapped region between the adjacent sensed signals is insufficient, so that the conventional touch panel fails to clearly determine the touch locus of the user. Specifically, when the user draws a straight line on the touch panel through the finger, the sensing linearity of the touch panel is caused to be poor, since the overlapped region of the adjacent sensed signals is insufficient.

SUMMARY OF THE INVENTION

Accordingly, the present invention is directed to a touch panel and a touch display panel, which has better sensing linearity.

The present invention provides a touch panel, which includes a substrate, a plurality of driving electrode series, and a plurality of sensing electrode series. The plurality of driving electrode series is disposed on the substrate, and each driving electrode series extends along a first direction. The plurality of sensing electrode series is disposed on the substrate, and each sensing electrode series extends along a second direction, in which the first direction is different from the second direction. The plurality of driving electrode series and the plurality of sensing electrode series are intersected to constitute a plurality of sensing units, in which each sensing unit has a center region and a surrounding region. A first electrode spacing is formed between the driving electrode series and the sensing electrode series disposed in the center region, and a second electrode spacing is formed between the driving electrode series and the sensing electrode series disposed in the surrounding region. The second electrode spacing is smaller than the first electrode spacing.

The present invention further provides a touch display panel, which includes a display panel and a touch sensing element. The touch sensing element is disposed on the display panel, and includes a plurality of driving electrode series and a plurality of sensing electrode series. Each driving electrode series extends along a first direction, and each sensing electrode series extends along a second direction. The plurality of driving electrode series and the plurality of sensing electrode series are intersected to constitute a plurality of sensing units, in which each sensing unit has a center region and a surrounding region. A first electrode spacing is formed between the driving electrode series and the sensing electrode series disposed in the center region, and a second electrode spacing is formed between the driving electrode series and the sensing electrode series disposed in the surrounding region. The second electrode spacing is smaller than the first electrode spacing.

In an embodiment of the present invention, each of the sensing units constituted by intersecting the driving electrode series and the sensing electrode has a geometric center. Specifically, in each sensing unit, a distance from the geometric center to a boundary of the sensing unit is D, and a distance d from a boundary of the center region to the geometric center satisfies, for example, a formula of $0 \leq d \leq 0.95$ D, preferably satisfies a formula of $0 \leq d \leq 0.8$ D, and more preferably satisfies a formula of $0 \leq d \leq 0.5$ D.

In an embodiment of the present invention, in the sensing units, the first electrode spacing G1 and the second electrode spacing G2 satisfies, for example, a formula of $0.06 \leq G2/G1 \leq 0.8$, preferably satisfies a formula of $0.07 \leq G2/G1 \leq 0.7$, and more preferably satisfies a formula of $0.1 \leq G2/G1 \leq 0.6$.

In an embodiment of the present invention, the plurality of driving electrode series is electrically insulated from each other, and the plurality of sensing electrode series is electrically insulated from each other.

In an embodiment of the present invention, each of the plurality of driving electrode series includes a driving electrode trunk extending along the first direction and a plurality of driving electrode branches extending along the second direction, and each of the plurality of sensing electrode series includes a sensing electrode trunk extending along the second direction and a plurality of sensing electrode branches extending along the first direction. Specifically, each driving electrode trunk includes a plurality of strip conductors and a plurality of driving bridge connectors, and each driving bridge connector spans the corresponding sensing electrode trunk and is connected between two adjacent strip conductors.

In an embodiment of the present invention, the touch panel further includes a plurality of patterned dielectric layers. The plurality of patterned dielectric layers are each located at intersection points of the plurality of driving electrode series and the plurality of sensing electrode series, and between each of the plurality of driving electrode series and each of the plurality of sensing electrode series.

In an embodiment of the present invention, the touch sensing element is integrated in the display panel.

In an embodiment of the present invention, the touch display panel further includes an auxiliary substrate, and the touch sensing element is disposed on the display panel through the auxiliary substrate.

Based on the above, in the touch panel and the touch display panel of the present invention, the sensing unit is divided into different regions, and the electrode spacing between the driving electrode series and the sensing electrode series satisfies a certain relation in the different regions of the sensing unit, thus improving the whole sensing sensitivity, and the linearity of the capacitive touch panel.

In order to make the features and advantages of the present invention more comprehensible, the present invention is described in further detail below with reference to embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4B is a schematic view of energy distribution of a sensed signal as shown in FIG. 4A;

DESCRIPTION OF THE EMBODIMENTS

Figure 1A:
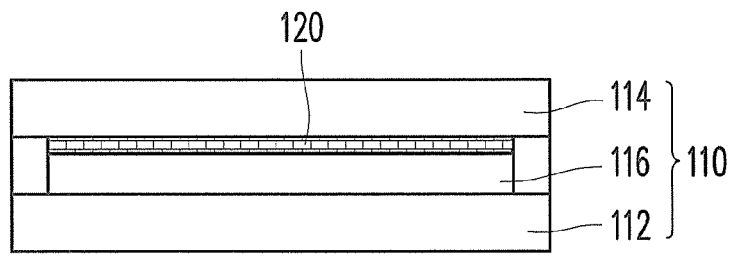
FIGS. 1A to 1C are schematic views of different touch display panels according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
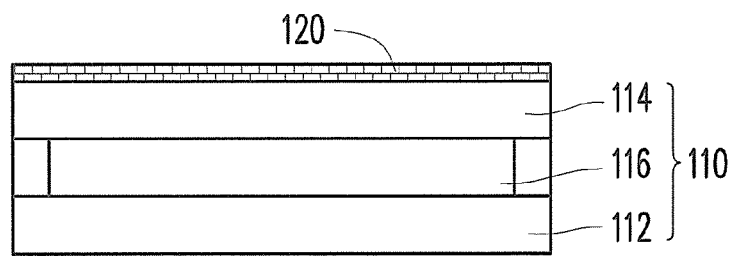
Figure 1C:
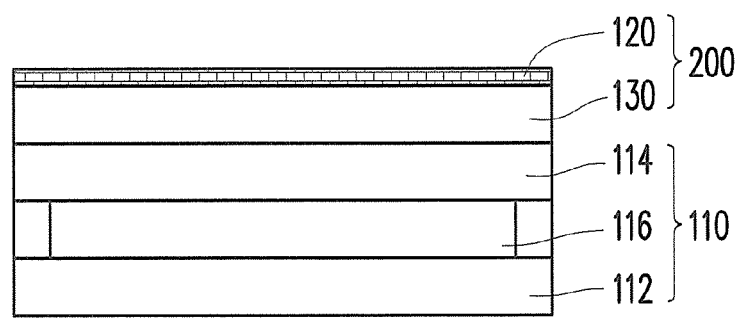

FIGS. 1A to 1C are schematic views of different touch display panels according to an embodiment of the present invention. Referring to FIG. 1A first, a touch display panel 100A in this embodiment includes a display panel 110 and a touch sensing element 120 disposed on the display panel 110. In this embodiment, the touch sensing element 120 may be internally disposed in the display panel 110. The display panel 110 may be a liquid crystal display (LCD) panel, an organic light emitting display panel, an electrophoretic display panel, or a plasma display panel, and the type of the display panel 110 is not limited in the present invention. The display panel 110 in this embodiment is exemplified with an LCD panel, and includes an active element array substrate 112, a color filter substrate 114, and a liquid crystal layer 116 located between the two substrates 112 and 114. The touch sensing element 120 may be embedded and integrated on an internal surface of the color filter substrate 114. In other words, the touch sensing element 120 is located between the color filter substrate 114 and the liquid crystal layer 116, and thus the touch display panel 100A in this embodiment employs a so-called in-cell design.

In addition, the touch sensing element 120 may also be directly formed on an external surface of the color filter substrate 114 of a display panel 100B, as shown in FIG. 1B. Therefore, the touch display panel 100B in this embodiment employs a so-called on-cell design. Definitely, the touch sensing element 120 may also be made on an auxiliary substrate 130, and then the auxiliary substrate 130 having the touch sensing element 120 is attached to the external surface of the color filter substrate 114. The touch sensing element 120 may be located between the auxiliary substrate 130 and the color filter substrate 114. Alternatively, the auxiliary substrate 130 may be located between the touch sensing element 120 and the color filter substrate 114, as shown in FIG. 1C. Therefore, a touch display panel 100C in this embodiment employs a so-called out-cell design.

It should be noted that, the auxiliary substrate 130 and the touch sensing element 120 in FIG. 1C constitute a touch panel 200 of this embodiment, and the touch panel 200 is combined with the display panel 110 to constitute the touch display panel 100C of this embodiment. In other words, the touch sensing element 120 of the present invention may be integrated into the display panel 110 (directly internally disposed on the internal surface of the color filter substrate 114 as shown in FIG. 1A, or directly formed on the external surface of the color filter substrate 114 as shown in FIG. 1B), or may also be attached to the display panel 110 through the auxiliary substrate 130. The integration manner of the touch sensing element 120 and the display panel 110 is not limited in the present invention.

The touch panel and different types of touch sensing elements on the touch display panel are described in detail below.

Figure 2:
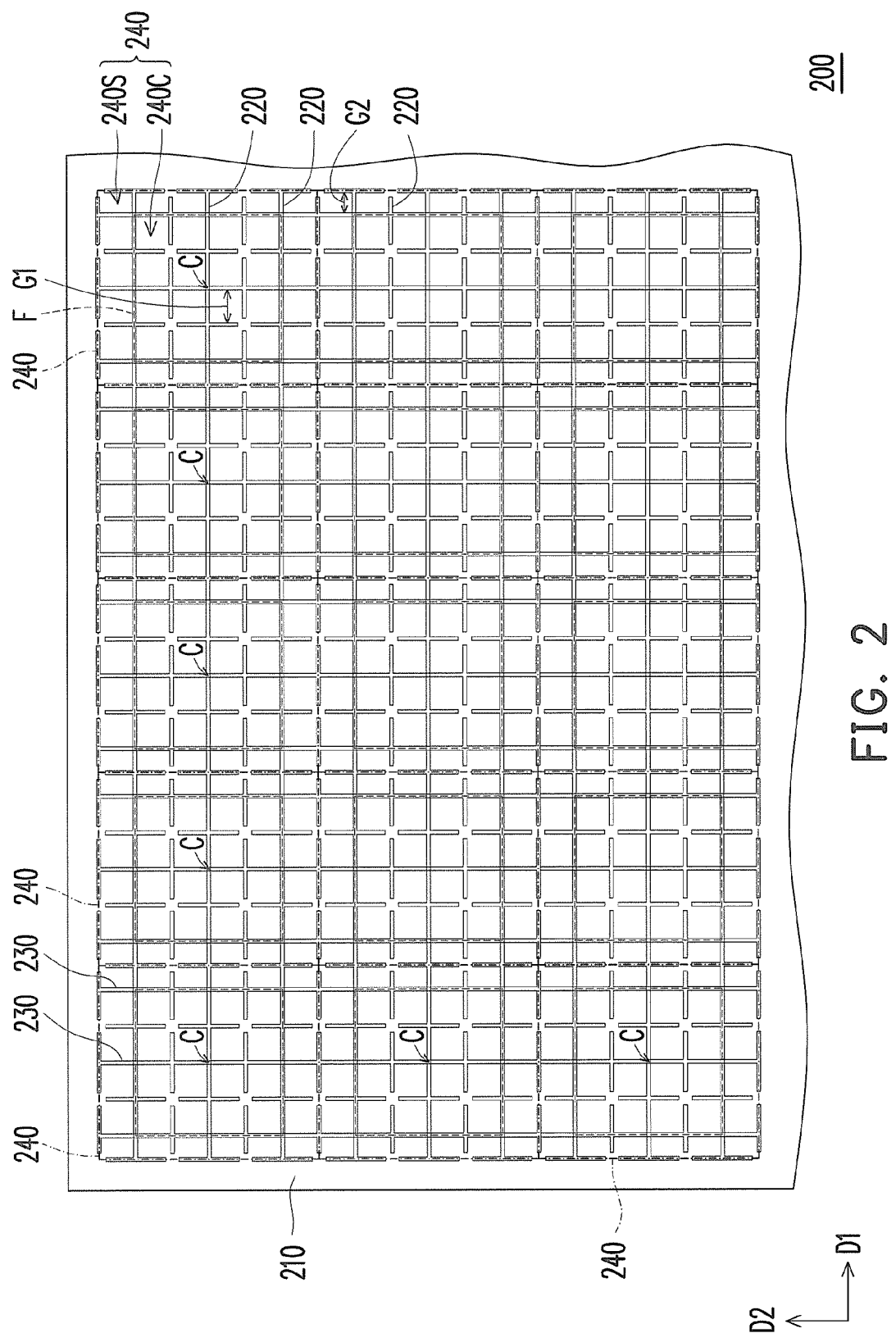
FIG. 2 is a top view of a touch panel according to an embodiment of the present invention.

FIG. 2 is a top view of a touch panel according to an embodiment of the present invention. Referring to FIG. 2, a touch panel 200 in this embodiment includes a substrate 210, a plurality of driving electrode series 220 and a plurality of sensing electrode series 230, in which the substrate 210 may be the auxiliary substrate 130 or the color filter substrate 114 as shown in FIGS. 1A to 1C. As shown in FIG. 2, the plurality of driving electrode series 220 is disposed on the substrate 210 and electrically insulated from each other, and each driving electrode series 220 extends along a first direction D1. The plurality of sensing electrode series 230 is disposed on the substrate 210 and electrically insulated from each other, and each sensing electrode series 230 extends along a second direction D2. The first direction D1 is different from the second direction D2, and in this embodiment, the first direction D1 is substantially perpendicular to the second direction D2.

Referring to FIG. 2, the plurality of driving electrode series 220 and the plurality of sensing electrode series 230 are intersected to constitute a plurality of sensing units 240, and only a 3×5 array of sensing units 240 are schematically shown in FIG. 2. As shown in FIG. 2, each sensing unit 240 has a center region 240C and a surrounding region 240S. The center region 240C is, for example, a range encircled by a dashed frame F in the drawing, and the surrounding region 240S is, for example, a range encircled by a boundary of the sensing unit 240 and the dashed frame F in the drawing. Particularly, a first electrode spacing G1 is formed between the driving electrode series 220 and the sensing electrode series 230 disposed in the center region 240C, and a second electrode spacing G2 is formed between the driving electrode series 220 and the sensing electrode series 230 disposed in the surrounding region 240S. The second electrode spacing G2 is smaller than the first electrode spacing G1. Since in each sensing unit 240, the second electrode spacing G2 formed in the surrounding region 240S is smaller than the first electrode spacing G1 formed in the center region 240C, sensed signals of adjacent sensing units 240 may be relatively fully overlapped. When a finger, a stylus or other things draws a straight line on the touch panel 200, a touched point may be calculated through interpolation according to the overlapped proportion of the adjacent sensed signals. Therefore, the sensing linearity is desirable, and description is made in detail below.

To make the structure of the touch sensing element of the present invention clearer, description is made in detail below with reference to FIG. 3A.

Figure 3B:
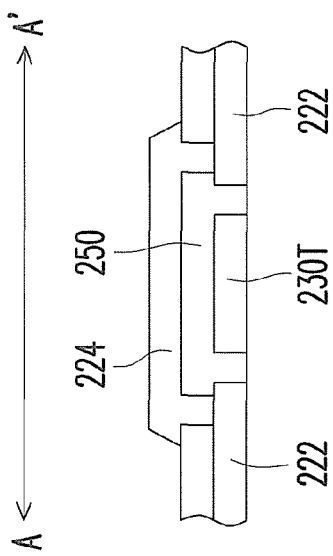
FIG. 3B is a schematic cross-sectional view of FIG. 3A along a cross-sectional line A-A'.
Figure 3A:
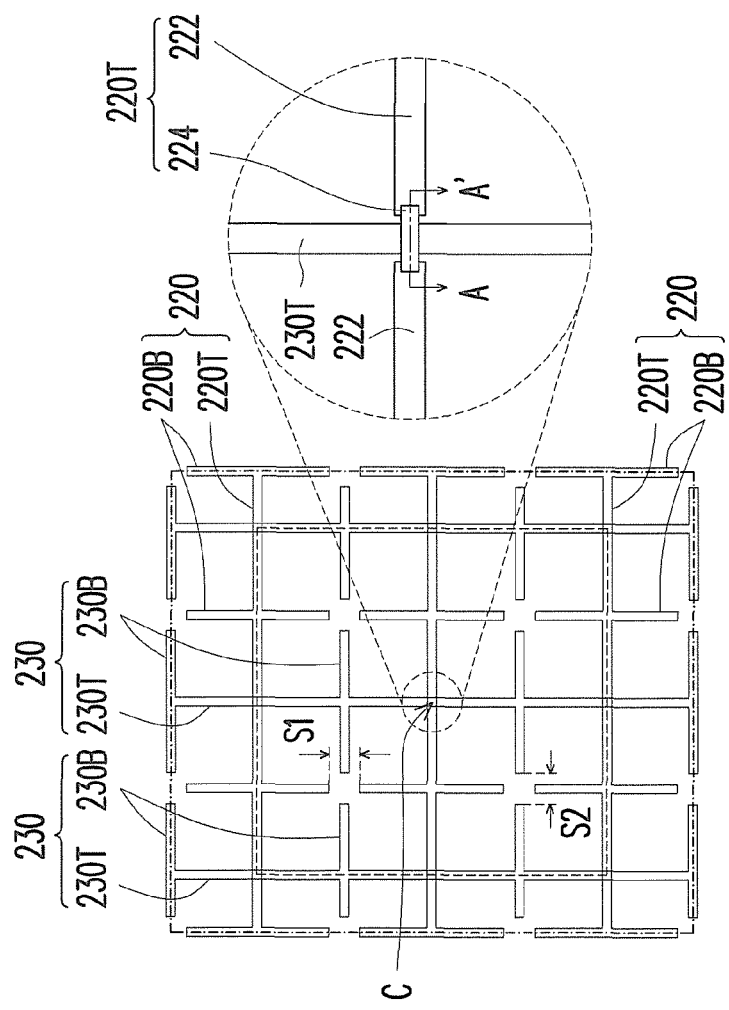
FIG. 3A is a schematic enlarged view of a sensing unit in the touch panel as shown in FIG. 2.

FIG. 3A is a schematic enlarged view of a sensing unit in the touch panel as shown in FIG. 2. Referring to FIG. 2 and FIG. 3A, the plurality of driving electrode series 220 and the plurality of sensing electrode series 230 are intersected to define the plurality of sensing units 240 with array arrangement on the substrate 210. In this embodiment, each sensing unit 240 corresponds to at least one driving electrode series 220 and at least one sensing electrode series 230, and the driving electrode series 220 and the sensing electrode series 230 are intersected to constitute the sensing unit 240. When a finger, a stylus or other things touches the sensing unit 240, capacitance coupled between the driving electrode series 220 and the sensing electrode series 230 may be varied, and the varied capacitance is converted into a response signal which is transmitted to a controller, and then a coordinate of a touched position is calculated.

As shown in FIG. 3A, the each of the plurality of driving electrode series 220 in this embodiment includes a driving electrode trunk 220T extending along a first direction D1 and a plurality of driving electrode branches 220B extending along a second direction D2. In this embodiment, the first direction D1 is, for example, an X direction, and the second direction D2 is, for example, a Y direction. The driving electrode branches 220 of the adjacent driving electrode series 220 are opposite to each other, and have a first gap S1, so as to ensure the electrical insulation between the plurality of driving electrode series 220. Each of the plurality of sensing electrode series 230 in this embodiment includes a sensing electrode trunk 230T extending along the second direction D2, and a plurality of sensing electrode branches 230B extending along the first direction D1. The sensing electrode branches 230B of the adjacent sensing electrode series 230 are opposite to each other, and have a second gap S2, so as to ensure the electrical insulation between the plurality of sensing electrode series 230. It should be noted that, the first gap S1 and the second gap S2 are lower in size, and hard to be observed by a user, and thus the touch panel 200 have a desirable visual effect. In addition, for the purpose of achieving uniform transmittance and desirable visual effect of the regions on the touch panel 200, in this embodiment, the driving electrode trunks 220T, the driving electrode branches 220B, the sensing electrode trunks 230T and the sensing electrode branches 230B may be formed of mesh lines or bore lines; however, the shape of the electrode is not limited in the present invention.

As shown in the enlarged view of FIG. 3A, in this embodiment, the driving electrode trunk 220T further includes a plurality of strip conductors 222 extending along the first direction D1 and a plurality of driving bridge connectors 224 extending along the first direction D1, in which, each driving bridge connector 224 spans the corresponding sensing electrode trunk 230T and is connected between two adjacent strip conductors 222. In this embodiment, the material of the strip conductor 222, the sensing electrode trunk 230T and the sensing electrode branch 230B may be, for example, the same. In other words, in this embodiment, the strip conductor 222, the sensing electrode trunk 230T and the sensing electrode branch 230B belong to the same layer of patterned film. For example, the material of the strip conductor 222, the sensing electrode trunk 230T and the sensing electrode branch 230B may all be a transparent conductive material, such as indium tin oxide (ITO) or indium zinc oxide (IZO). In addition, the driving bridge connector 224 is, for example, a film layer different from the strip conductor 222, the sensing electrode trunk 230T and the sensing electrode branch 230B, and the material thereof may be metal, such as aluminium, copper, silver, gold, titanium, molybdenum, chromium, tungsten, and an alloy and a lamination thereof. In a varied embodiment, the material of the strip conductor 222, the sensing electrode trunk 230T, the sensing electrode branch 230B, and the driving bridge connector 224 may all be metal, such as aluminium, copper, silver, gold, titanium, molybdenum, chromium, tungsten, and an alloy and a lamination thereof In this case, the line width should be rather small, and is preferably smaller than 10 μm, so as to reduce the visual visibility.

FIG. 3B is a schematic cross-sectional view of FIG. 3A along A-A'. Referring to FIG. 3B, in order to effectively avoid the occurrence of short circuit between the driving electrode series 220 and the sensing electrode series 230, the touch sensing element 120 of this embodiment may further includes a plurality of patterned dielectric layers 250, in which the patterned dielectric layers 250 are respectively located below one of the driving bridge connectors 224, so as to ensure the electrical insulation between each of the plurality of driving bridge connector 224 and the sensing electrode series 230.

In order to clearly describe the signals sensed when the touch sensing element is touched, sensing linearity of the touch panel 200 when a user touches the sensing unit 240 is described below with the touch panel 200 as shown in FIG. 2A as an example.

Figure 4A:
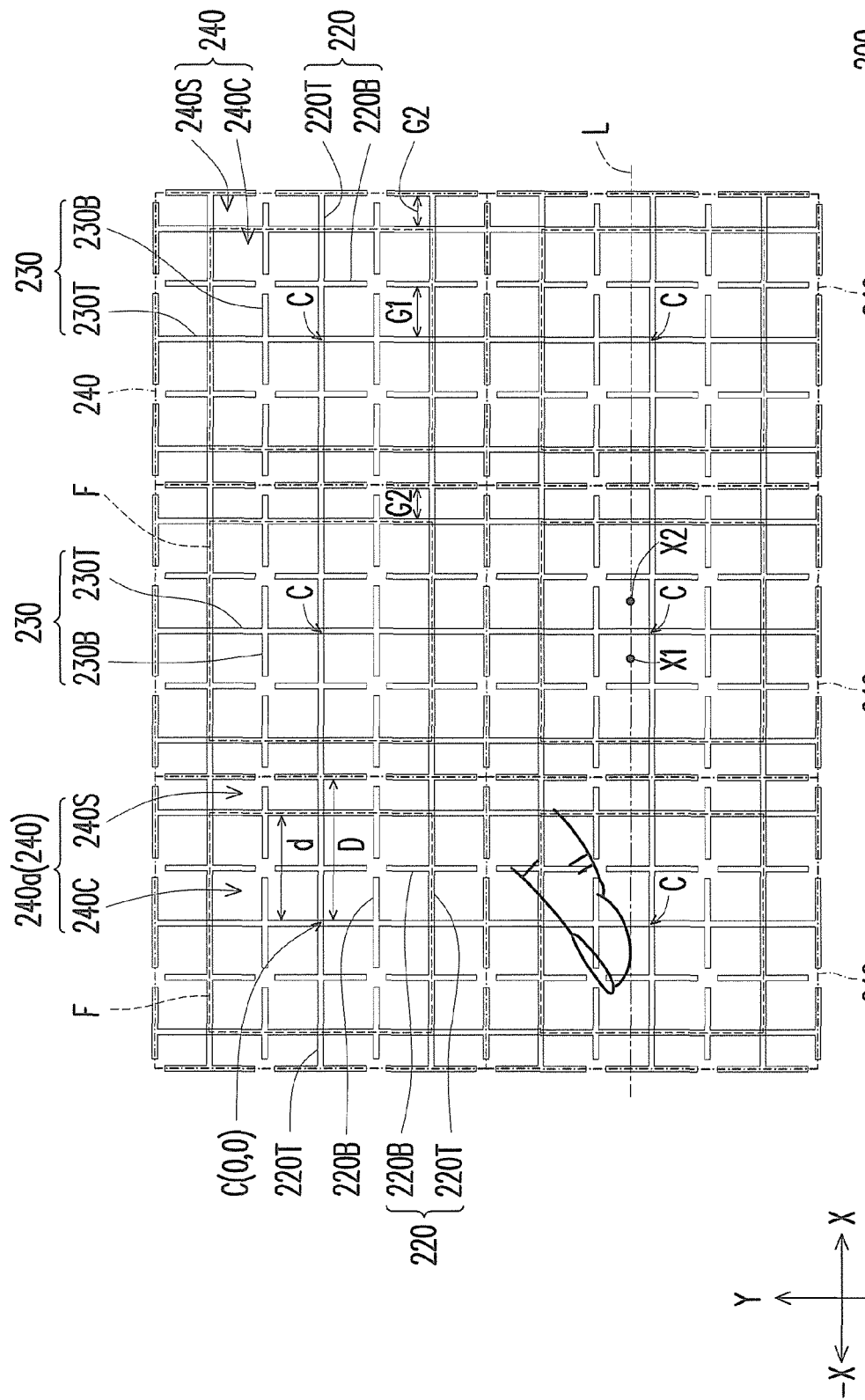
FIG. 4A is a schematic enlarged view of a partial region in the touch panel as shown in FIG. 2.

FIG. 4A is a schematic enlarged view of a partial region in the touch panel as shown in FIG. 2, and FIG. 4B is a schematic view of energy distribution of a sensed signal as shown in FIG. 4A. FIG. 4A schematically illustrates a locus L of a straight line drawn by a user on the touch panel 200, and FIG. 4B is correspondingly the schematic view of the energy distribution of the sensed signal as shown in FIG. 4A. Referring to FIG. 4A, when an intersection point (such as a point C in FIG. 4A) of the driving electrode series 220 and the sensing electrode series 230 is a geometrical center C of one sensing unit 240, a plurality of repeated sensing units 240 with array arrangement may be defined on the touch panel 200. Moreover, as described above, each sensing unit 240 is divided into a center region 240C (a range encircled by a dashed frame F)

and a surrounding region 240S (a range encircled by a boundary of the sensing unit 240 and the dashed frame F) surrounding the center region 240C. Specifically, the range of the center region 240C may be designed according to the following relation. If a unit distance from the geometrical center C of the sensing unit 240 to a boundary of the sensing unit 240 is D, and the distance from the boundary of the center region 240C to the geometrical center C is d, a ratio of the distance d to the unit distance D preferably satisfies a formula of $0 \leq d \leq 0.95$ D, more preferably satisfies a formula of $0 \leq d \leq 0.8$ D, and more preferably satisfies a formula of $0 \leq d \leq 0.5$ D.

For example, a rectangle sensing unit 240 of this embodiment is taken as an example. When the intersection geometric center of the driving electrode series 220 and the sensing electrode series 230 is used as an origin C (0,0) of an XY coordinate axes, the upper left sensing unit 240a is, for example, a range encircled by $-D \leq x \leq D$ and $-D \leq y \leq D$, the center region 240C is, for example, a range encircled by $-0.95 D \leq x \leq 0.95$ D and $-0.95 D \leq y \leq 0.95$ D, and in this case, the surrounding region 240S is correspondingly a range encircled by $-D \leq x \leq -0.95$ D, $0.95 D \leq x \leq D$, $-D \leq y \leq -0.95$ D, and $0.95 D \leq y \leq D$. In addition, when the center region 240C of the sensing unit 240a is a range encircled by $-0.8 D \leq x \leq 0.8$ D and $-0.8 D \leq y \leq 0.8$ D, the surrounding region 240S is correspondingly a range encircled by $-D \leq x \leq -0.8$ D, $0.8 D \leq x \leq D$, $-D \leq y \leq -0.8$ D, and $0.8 D \leq y \leq D$. Moreover, when the center region 240C of the sensing unit 240a is a range encircled by $-0.5 D \leq x \leq 0.5$ D and $-0.5 D \leq y \leq 0.5$ D, the surrounding region 240S is correspondingly a range encircled by $-D \leq x \leq -0.5$ D, $0.5 D \leq x \leq D$, $-D \leq y \leq -0.5$ D, and $0.5 D \leq y \leq D$.

It should be noted that, the sensing unit may also be of a round shape, a diamond shape, a triangle shape, or a hexagon shape, in addition to the rectangle shape in this embodiment, and may be changed according to the design requirements. In short, when the sensing unit is of a round shape, the intersection geometric center of the driving electrode series and the sensing electrode series is the center of the round sensing unit, and the range of the center region may be designed according to the above relation. The distance d from the boundary of the center region to the geometric center is preferably satisfies the formula of $0 \leq d \leq 0.95$ D, more preferably satisfies the formula of $0 \leq d \leq 0.8$ D, and more preferably satisfies the formula of $0 \leq d \leq 0.5$ D.

At this time, D is defined as a radius from the geometric center of the round sensing unit to the boundary, and in short, the shape of the sensing unit 240 is not limited in the present invention.

Particularly, in each sensing unit 240 of this embodiment, the second electrode spacing G2 formed in the surrounding region 240S is smaller than the first electrode spacing G1 formed in the center region 240C. Specifically, the first electrode spacing G1 and the second electrode spacing G2 are parallel spacing of the driving electrode series 220 and the sensing electrode series 230 along the first direction D1 and the second direction D2. FIG. 4A illustrates the parallel spacing of the driving electrode series 220 and the sensing electrode series 230 along the first direction D1 (X direction). A ratio of the second electrode spacing G2 to the first electrode spacing G1 is smaller than 1, and the ratio of the second electrode spacing G2 to the first electrode spacing G1 satisfies a formula of $0.06 \leq G2/G1 \leq 0.8$. More specifically, the first electrode spacing G1 and the second electrode spacing G2 preferably satisfies a formula of $0.07 \leq G2/G1 \leq 0.7$, and more preferably satisfies a formula of $0.1 \leq G2/G1 \leq 0.6$. In this embodiment, the first electrode spacing G1 and the second electrode spacing G2 are the distances between the driving electrode branch 220B and the corresponding sensing electrode trunk 230T. Definitely, in other embodiments, the first electrode spacing G1 and the second electrode spacing G2 may also be the distances between the sensing electrode branch 230B and the adjacent driving electrode trunk 220T, and the present invention is not limited thereto.

Referring to FIGS. 4A and 4B, when a finger, a stylus or other electromagnetic things touches a sensing unit 240P, a sensing unit 240q and a sensing unit 240r in sequence along the touch locus L as shown in FIG. 4A, the sensing unit 240p, the sensing unit 240q and the sensing unit 240r respectively generate a corresponding sensed signal 260p, sensed signal 260q, and sensed signal 260r. As shown in FIG. 4B, since the sensed signal 260p and the sensed signal 260r have a quite large overlapped region B in a waveform range of the sensed signal 260q, when a user touches the sensing unit 240q, the position of the touched point relative to the center of the sensing unit 240q can be accurately calculated according to the overlapped proportion of the sensed signal 260p and the sensed signal 260r. For example, referring to FIGS. 4A and 4B, when the touched point is a point X1 left to the center C of the sensing unit 240q, the sensed signal 260p is stronger than the sensed signal 260r. When the touch point is a point X2 right to the center of the sensing unit 240q, the sensed signal 260p is weaker than the sensed signal 260r, since a certain proportion relation exists between the sensed signal 260p and the sensed signal 260r. As a result, the position of the touched point may be accurately calculated through interpolation. In other words, in the touch panel of the present invention, a distance between two adjacent center regions 240C is shortened by reducing the second electrode spacing G2 on the surrounding region 240S, and thus the overlapped region B of the sensed signals 260p, 260q, and 260r generated by the adjacent sensing units 240p, 240q, and 240r is increased. Then, the position of the touched point is accurately calculated through the interpolation, and thus the touch panel of the present invention has a desirable sensing linearity.

In addition, in order to further improve the sensing sensitivity, the designer further increases the first electrode spacing G1 of the center region 240C, to increase the capacitance variation between the driving electrode series 220 and the sensing electrode series 230, and thus the sensed signal 260 of capacitance variation on the center region 240C is further strengthened on the premise of maintaining the sensing linearity, so as to improve the sensing sensitivity of the sensing unit 240.

Figure 5A:
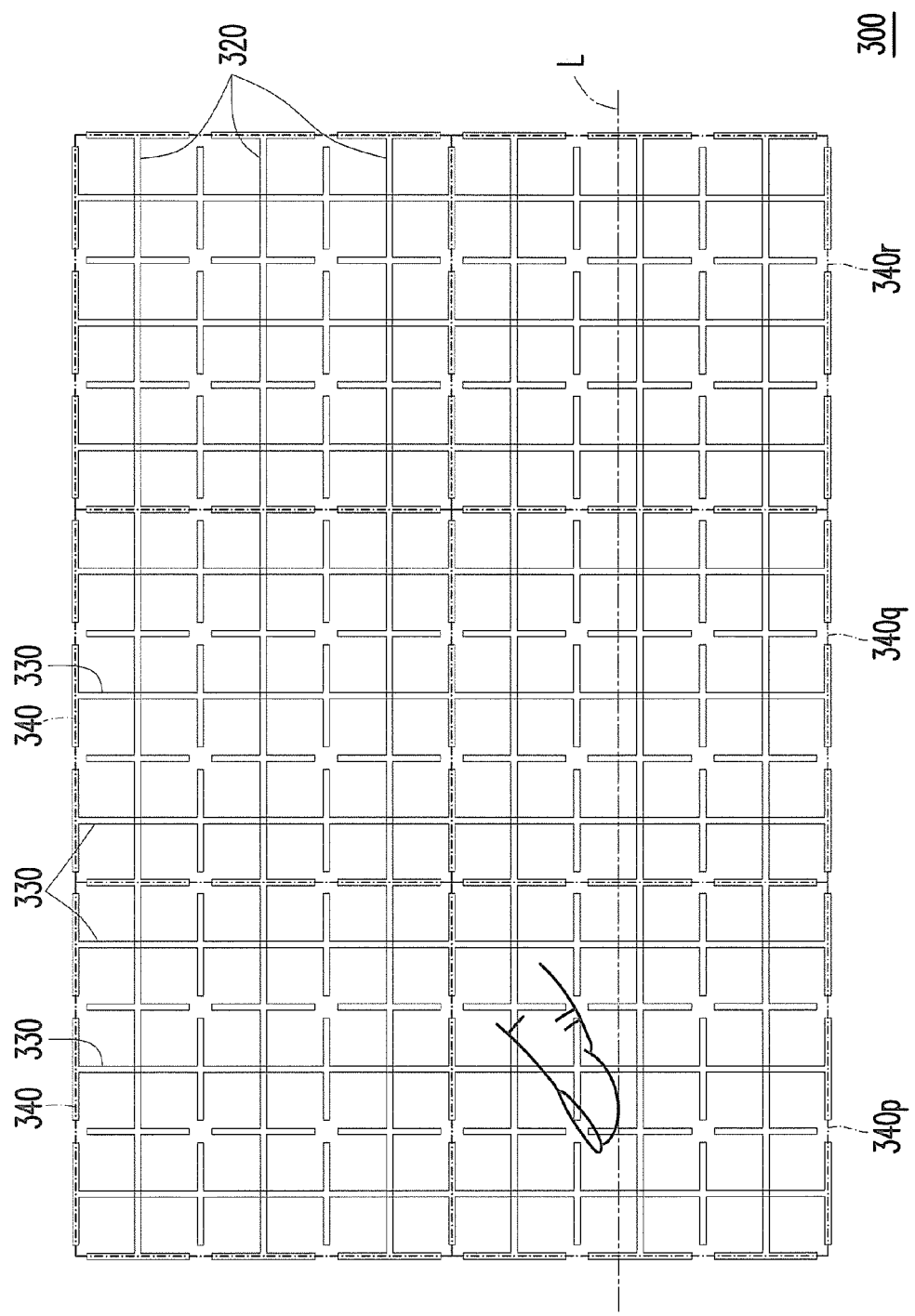
FIG. 5A is a schematic structural view of a touch panel as a comparison example.
Figure 5B:
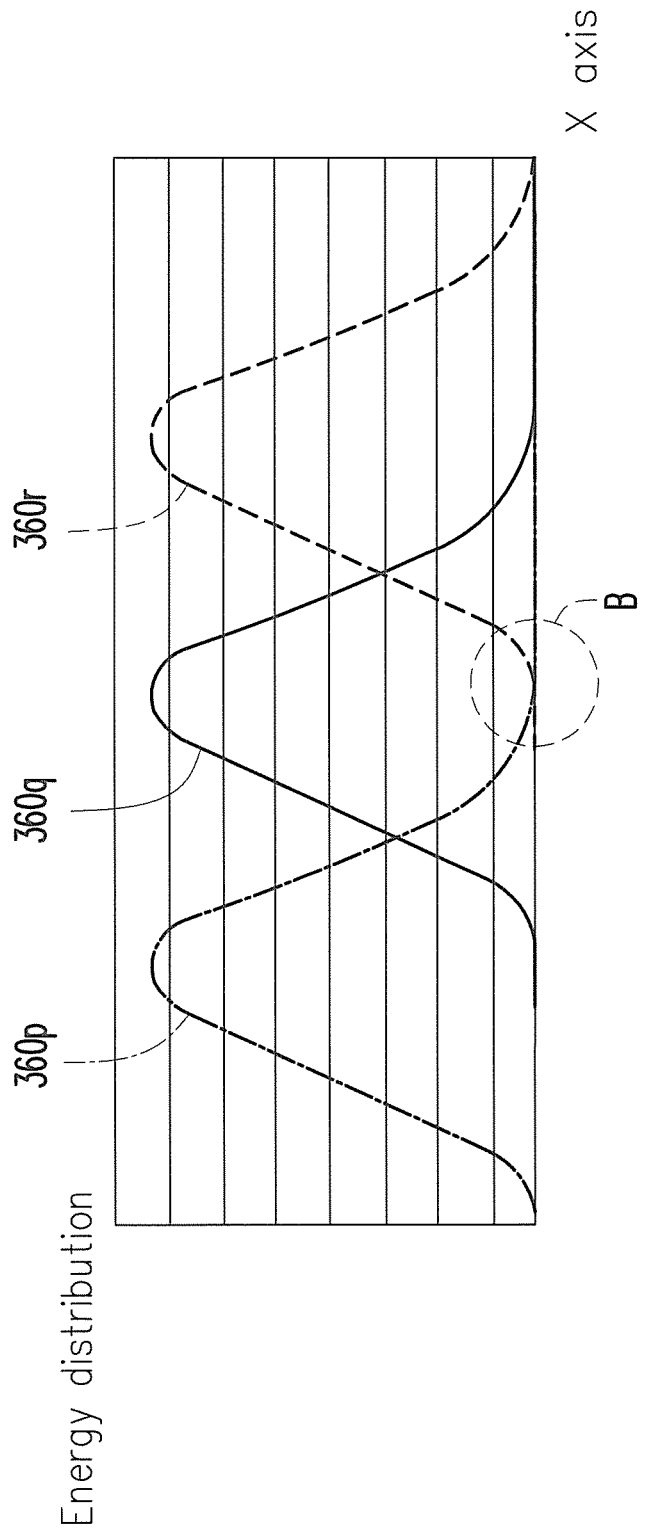
FIG. 5B is a schematic view of energy distribution of a sensed signal as shown in FIG. 5A.

Correspondingly, FIGS. 5A and 5B show a touch panel of a comparison example.

FIG. 5A is a schematic view of a touch panel of a comparison example, and FIG. 5B is a schematic view of energy distribution of a sensed signal as shown in FIG. 5A. Driving electrode series 320 and sensing electrode series 330 in a touch panel 300 as shown in FIG. 5A are equidistantly arranged. As shown in FIG. 5B, since an electrode spacing between the driving electrode series 320 and the sensing electrode series 330 is a fixed value in any region of sensing units 340, and the electrode spacing is not variable, when a user touches and draws a straight line on a sensing unit 340p, a sensing unit 340q and a sensing unit 340r in sequence along a touch locus as shown in FIG. 5A by using a finger, a stylus or other things, the sensing unit 340p, the sensing unit 340q and the sensing unit 340r respectively generate a corresponding sensed signal 360p, sensed signal 360q, and sensed signal 360r. Because an overlapped region B between the adjacent sensed signals 360p, 360q, and 360r is insufficient, a touched point can not be calculated by using the overlapped proportion of the adjacent sensed signals in combination with interpolation, thus causing that the touch panel 300 fails to clearly determine the touch location and touch locus touched by the user.

Figure 6A:
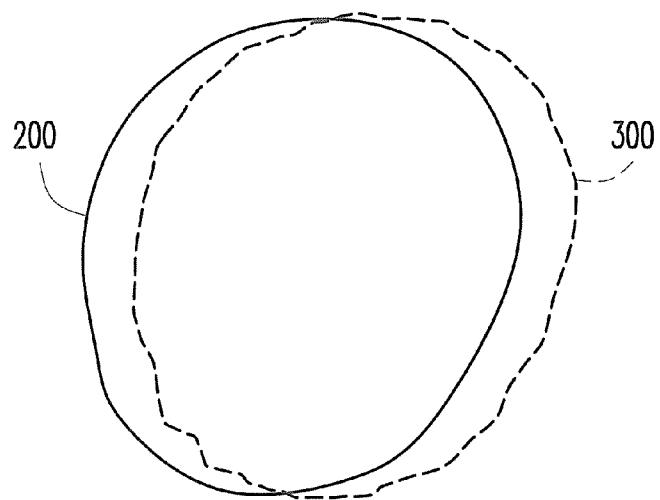
FIGS. 6A and 6B compare sensing circularity and sensing linearity of the touch panel as shown in FIGS. 4A and 5A.
Figure 6B:
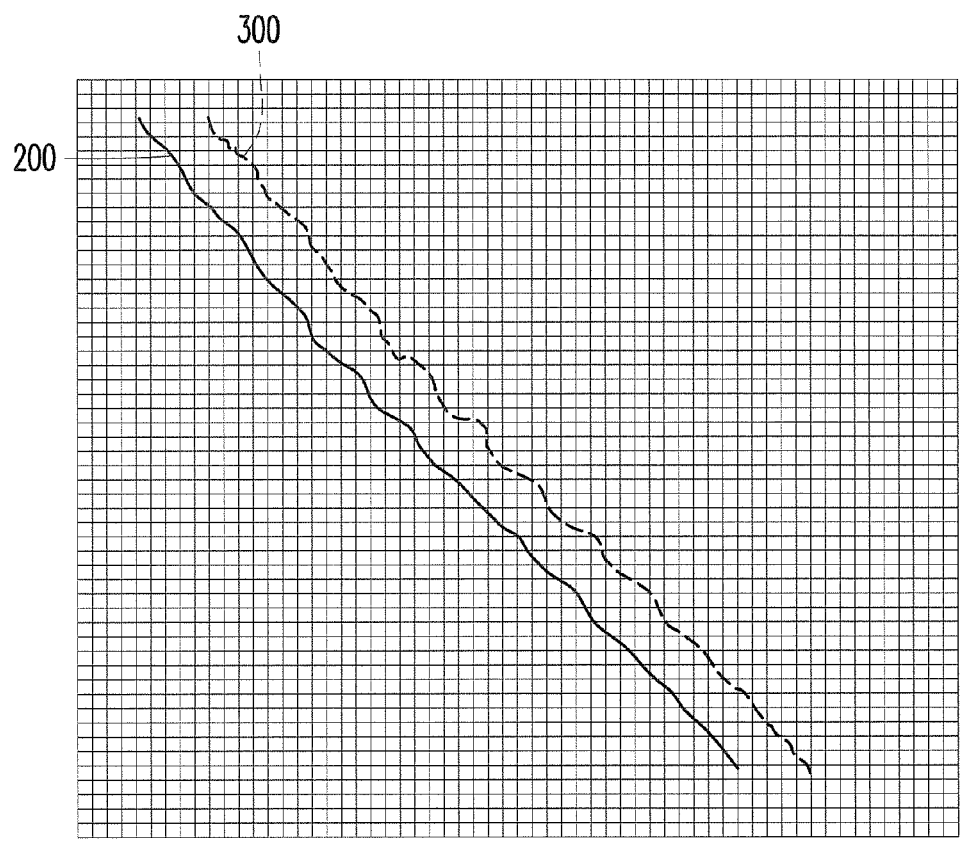

FIGS. 6A and 6B further compare the sensing linearity and the sensing circularity of the touch panels according to the embodiment of FIG. 4A and the comparison example of FIG. 5A. FIG. 6A compares the sensing circularity when a touch locus is of a round shape or a circular shape, and FIG. 6B compares the sensing linearity when the touch locus is a straight line. It can be known from FIGS. 6A and 6B, the touch locus sensed by the touch panel 200 according to the embodiment of the present invention is relatively smooth, compared with the touch panel 300 of the comparison example, regardless of the round or the straight touch locus of the user. Therefore, the sensing linearity and the sensing circularity of the touch panel 200 in FIG. 4A is better than the touch panel 300 in FIG. 5A.

In conclusion, each of the sensing units in the touch panel and the touch display panel of the present invention is divided into a center region and a surrounding region, and a smaller electrode spacing is formed in the center region than the surrounding region of the sensing unit, and thereby the touch panel and the touch display panel have high sensing sensitivity and sensing linearity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
a substrate;
a plurality of driving electrode series, disposed on the substrate, wherein each of the plurality of driving electrode series comprises a driving electrode trunk extending along a first direction and a plurality of driving electrode branches extending along a second direction, the first direction being different from the second direction extending along a first direction; and
a plurality of sensing electrode series, disposed on the substrate, wherein each of the plurality of sensing electrode series comprises a sensing electrode trunk extending along the second direction and a plurality of sensing electrode branches extending along the first direction, the plurality of driving electrode trunks and the plurality of sensing electrode trunks being intersected to constitute a plurality of sensing units, each sensing unit having a center region and a surrounding region, wherein the center region is located inside the surrounding region, wherein one of a sensing electrode trunk and one of the adjacent driving electrode branch disposed in the center region form a capacitor and a first electrode spacing along the first direction, and the same sensing electrode trunk and another one of the adjacent driving electrode branch disposed in the surrounding region form a capacitor and a second spacing along the first direction, and the second electrode spacing is smaller than the first electrode spacing.

2. The touch panel according to claim 1, wherein each of the sensing units constituted by intersecting the driving electrode series and the sensing electrode has a geometric center.

3. The touch panel according to claim 2, wherein in each sensing unit, a distance from the geometric center to a boundary of the sensing unit is D, and a distance d from a boundary of the center region to the geometric center satisfies a formula of $0 \leq d \leq 0.95\,D$.

4. The touch panel according to claim 3, wherein the distance d from the boundary of the center region to the geometric center satisfies a formula of $0 \leq d \leq 0.8\,D$.

5. The touch panel according to claim 3, wherein the distance d from the boundary of the center region to the geometric center satisfies a formula of $0 \leq d \leq 0.5\,D$.

6. The touch panel according to claim 1, wherein in each sensing unit, a ratio of the second electrode spacing G2 to the first electrode spacing G1 is in the range of $0.06 \leq G2/G1 \leq 0.8$.

7. The touch panel according to claim 1, wherein a ratio of the second electrode spacing G2 to the first electrode spacing G1 is in the range of $0.07 \leq G2/G1 \leq 0.7$.

8. The touch panel according to claim 1, wherein a ratio of the second electrode spacing G2 to the first electrode spacing G1 is in the range of $0.1 \leq G2/G1 \leq 0.6$.

9. The touch panel according to claim 1, wherein the plurality of driving electrode series is electrically insulated from each other, and the plurality of sensing electrode series is electrically insulated from each other.

10. The touch panel according to claim 1, wherein each driving electrode trunk comprises a plurality of strip conductors and a plurality of driving bridge connectors, and each driving bridge connector spans the corresponding sensing electrode trunk and is connected between two adjacent strip conductors.

11. The touch panel according to claim 1, further comprising a plurality of patterned dielectric layers, located at intersection points of the plurality of driving electrode series and the plurality of sensing electrode series, wherein each patterned dielectric layer is located between each of the plurality of driving electrode series and each of the plurality of sensing electrode series, so as to electrically isolate the driving electrode and the sensing electrode.

12. The touch panel according to claim 1, wherein the plurality of sensing units are disposed with an array arrangement on the substrate.

13. The touch panel according to claim 1, wherein each of the sensing units comprises a plurality of driving electrode trunks and a plurality of sensing electrode trunks.

14. A touch display panel, comprising: a display panel;
a touch sensing element, disposed on the display panel, wherein the touch sensing element comprises:
a plurality of driving electrode series, wherein each of the plurality of driving electrode series comprises a driving electrode trunk extending along a first direction and a plurality of driving electrode branches extending along a second direction, the first direction being different from the second direction; and
a plurality of sensing electrode series, wherein each of the plurality of sensing electrode series comprises a sensing electrode trunk extending along the second direction and a plurality of sensing electrode branches extending along the first direction, the plurality of driving electrode trunks and the plurality of sensing electrode trunks being intersected to constitute a plurality of sensing units, each sensing unit having a center region and a surrounding region, wherein the center region is located inside the surrounding region, wherein one of a sensing electrode trunk and one of the adjacent driving electrode branch disposed in the center region form a capacitor and a first electrode spacing along the first direction, and the same sensing electrode trunk and another one of the adjacent driving electrode branch disposed in the surrounding region form a capacitor and a second spacing along the first direction, and the second electrode spacing is smaller than the first electrode spacing.

15. The touch display panel according to claim 14, wherein the touch sensing element is directly integrated on the display panel.

16. The touch display panel according to claim 14, further comprising an auxiliary substrate, wherein the touch sensing element is disposed on the display panel through the auxiliary substrate.

17. The touch display panel according to claim 14, wherein the touch sensing element is embedded and integrated into the display panel.

18. A touch panel, comprising:
   a substrate;
   a plurality of driving electrode series, disposed on the substrate, each of the plurality of driving electrode series extending along a first direction, each of the plurality of driving electrode series comprising at least one driving electrode trunk extending along the first direction and a plurality of driving electrode branches extending along a second direction; and
   a plurality of sensing electrode series, disposed on the substrate, each of the plurality of sensing electrode series extending along the second direction, the first direction being different from the second direction, each of the plurality of sensing electrode series comprising at least one sensing electrode trunk extending along the second direction and a plurality of sensing electrode branches extending along the first direction, the plurality of driving electrode series and the plurality of sensing electrode series being intersected to constitute a plurality of sensing units, each sensing unit having a center region and a surrounding region, wherein the center region is located inside the surrounding region, each of the sensing units comprising a plurality of driving electrode trunks and a plurality of sensing electrode trunks, wherein one of a sensing electrode trunk and one of the adjacent driving electrode branch disposed in the center region form a capacitor and a first electrode spacing along the first direction, and the same sensing electrode trunk and another one of the adjacent driving electrode branch disposed in the surrounding region form a capacitor and a second spacing along the first direction, and the second electrode spacing is smaller than the first electrode spacing.

\* \* \* \* \*